(12) United States Patent  (10) Patent No.: US 6,543,413 B2
Lozen et al.  (45) Date of Patent: Apr. 8, 2003

(54) SHORT RUNNER VALVE PLATE AND SHAFT BIASING LUBRICATION

(75) Inventors: Mark F. Lozen, Sterling Heights, MI (US); John W. Duddles, Clarkston, MI (US); Frederick K. Miller, Water Valley, MS (US); Kevin C. Goldstein, Eastpointe, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/974,069

(22) Filed: Oct. 10, 2001

(65) Prior Publication Data

US 2002/0088422 A1 Jul. 11, 2002

Related U.S. Application Data

(60) Provisional application No. 60/240,576, filed on Oct. 10, 2000.

(51) Int. Cl.[7] .............................. F02D 9/08; F16K 1/22
(52) U.S. Cl. ........................................ 123/337; 251/308
(58) Field of Search ............................. 123/184.55, 337; 251/308, 305, 306

(56) References Cited

U.S. PATENT DOCUMENTS

| | | | | | |
|---|---|---|---|---|---|
| 2,105,343 A | * | 1/1938 | Briggs | ........................ | 251/308 |
| 4,111,395 A | * | 9/1978 | Sheppard | ..................... | 251/306 |
| 4,213,595 A | * | 7/1980 | Sheppard | ..................... | 251/308 |
| 5,564,679 A | * | 10/1996 | Ericson et al. | .............. | 251/308 |
| 5,794,591 A | * | 8/1998 | Kalebjian et al. | ........... | 123/337 |
| 5,992,370 A | | 11/1999 | Pringle et al. | | |

* cited by examiner

Primary Examiner—Henry C. Yuen
Assistant Examiner—Hai H. Huynh
(74) Attorney, Agent, or Firm—Warn, Burgess & Hoffman, P.C.; Greg Dziegielewski

(57) ABSTRACT

A one piece slide in place "butterfly" valve plate for a short runner manifold of a vehicle. A method of reducing friction in an anti-chatter device.

27 Claims, 5 Drawing Sheets

SHORT RUNNER VALVE PLATE AND SHAFT BIASING LUBRICATION

BACKGROUND OF THE INVENTION

The present invention relates to a plastic short runner valve plate for use in a short runner valve manifold assembly.

In the past, it has typically been necessary to adjust and secure valve plates on shafts with built-on type mechanisms. There has been a need in the art to provide a self-centering and easy-to-assemble valve plate for use in a short runner valve. Details of a short runner valve manifold are found in U.S. Pat. No. 5,992,370, which patent is hereby incorporated herein by reference.

As shown in U.S. Pat. No. 5,992,370, typically these plates are secured with screws or fasteners. In fact, because of the difference in coefficients of expansion between the aluminum or metal plates and the polymer or plastic manifold, it is necessary to provide either increased tolerances or very specific assembly requirements, as shown in FIG. 10 of the '370 patent. Therefore, it has been a goal in the art to provide further streamlined manufacturing processes, lighter weight assemblies in the valve plate area, and closer tolerance parts with less differences of coefficients of expansion.

Additionally, the anti-chatter feature of the '370 patent discloses useful apparatus for reducing chatter in the short runner valve shafts. These are highly effective in reducing shaft chatter. However, there is some friction associated with these anti-chatter devices and their use. Therefore, it has been a goal in the art to further reduce friction of these anti-chatter devices while maintaining the effectiveness of anti-chatter devices. This would allow reduced actuation toward further streamlining and reducing weight in the short runner valve manifold.

SUMMARY OF THE INVENTION

Thus, in accordance with the present invention, there is provided a plastic or polymer valve plate for use in a short runner manifold. The short runner manifold includes a shaft portion with at least a first slot therein. The plate includes barbed tabs, which are insertable through the stop portion but expand at the other side of the slot portion. Also included is a stop for securing the plate from further movement through the slot. Thus, the plate is secured in the slot, with very little assembly required. Also provided in the present invention is a grease applicator and method for applying grease in the shaft biasing assemblies of a short runner valve manifold.

A further understanding of the present invention will be had in view of the description of the drawings and detailed description of the invention, when viewed in conjunction with the subjoined claims.

DETAILED DESCRIPTION OF THE PREFERRED EMBODIMENTS

Figure 2:
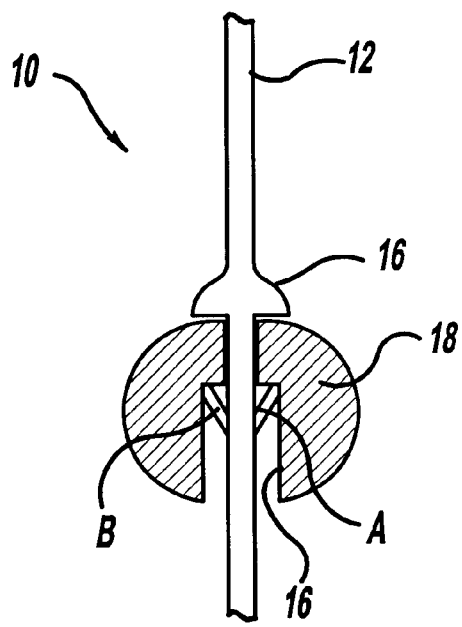
FIG. 2 is a sectional view taken along line 2—2 of FIG. 1, showing the valve plate assembly of the present invention.
Figure 1:
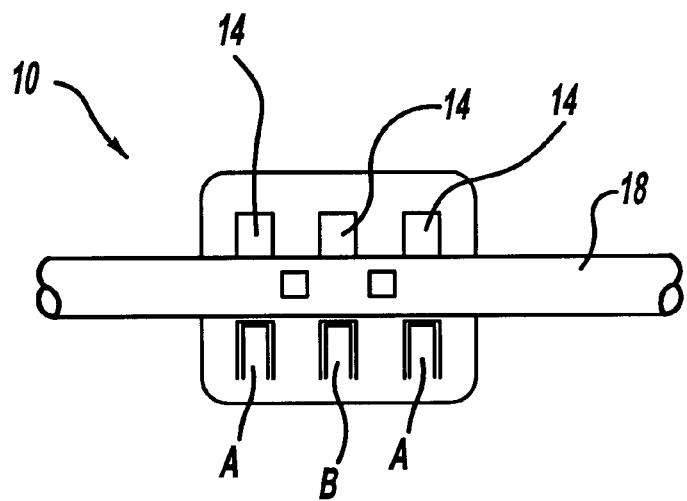
FIG. 1 is a plan view of the valve plate assembly of the present invention.

Referring to FIGS. 1 and 2, there is shown a first embodiment of a plastic clip-on valve plate assembly, generally shown at 10. FIGS. 3 through 9 show an alternate embodiment of the plastic short runner valve plate assembly, generally shown at 100.

Referring now to FIGS. 1 and 2, the valve plate 12 includes a widened portion 14 and tabs A and B for securing the member in a widened area of a slot in a short runner valve shaft 16. Tabs A and B are compressible for installation, and then flare out to lock, hold and secure the plate in the shaft. The plate is self-centering and is lighter and easier to assemble than short runner valve plates of the past.

Figure 3:
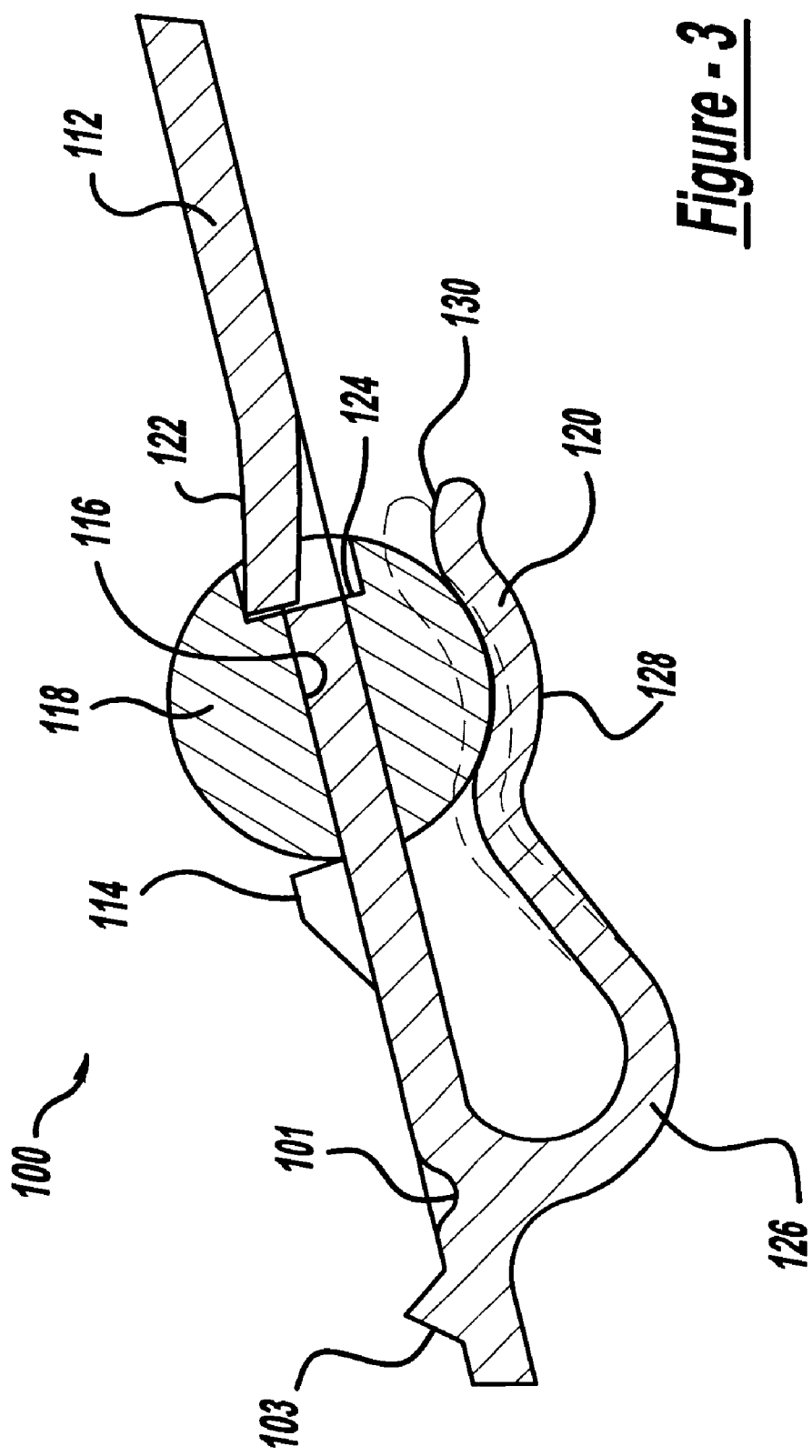
FIG. 3 is an alternate embodiment of a clip-in valve plate assembly as set forth in the present invention.
Figure 4:
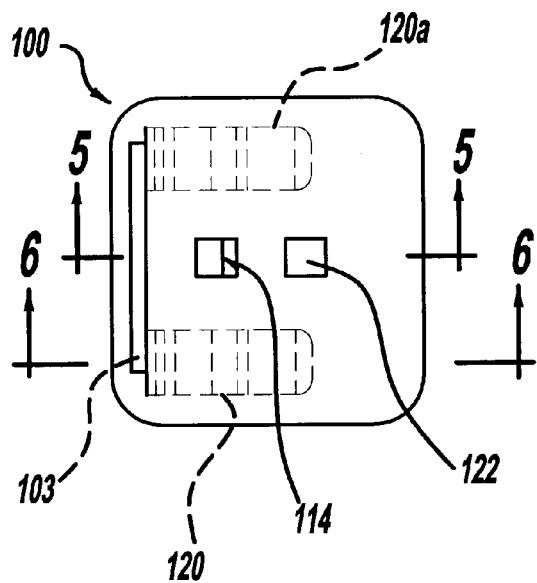
FIG. 4 is a top view of the clip in the valve plate of the present invention.
Figure 5:
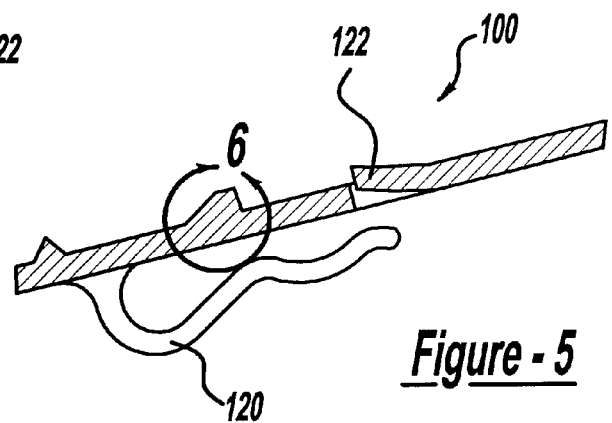
FIG. 5 is a sectional view of the clip on the valve plate of FIG. 4 taken along line 5—5 of FIG. 4.
Figure 7:
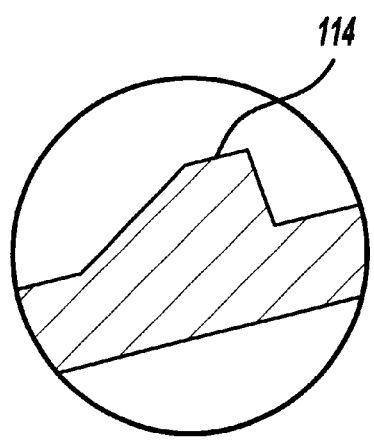
FIG. 7 is a detailed sectional view taken from area 6 of FIG. 4.
Figure 6:
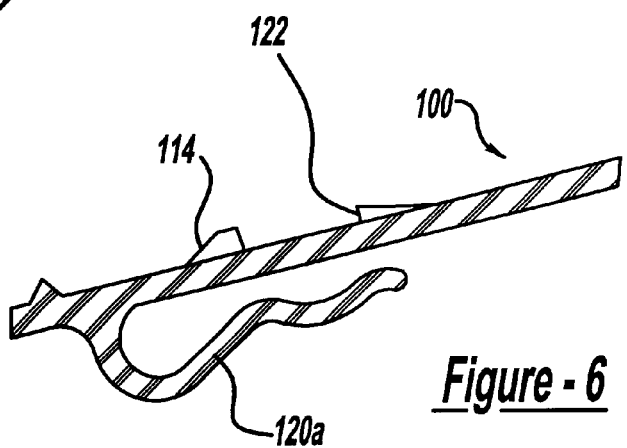
FIG. 6 is a sectional view taken along line 6—6 of FIG. 4.
Figure 8:
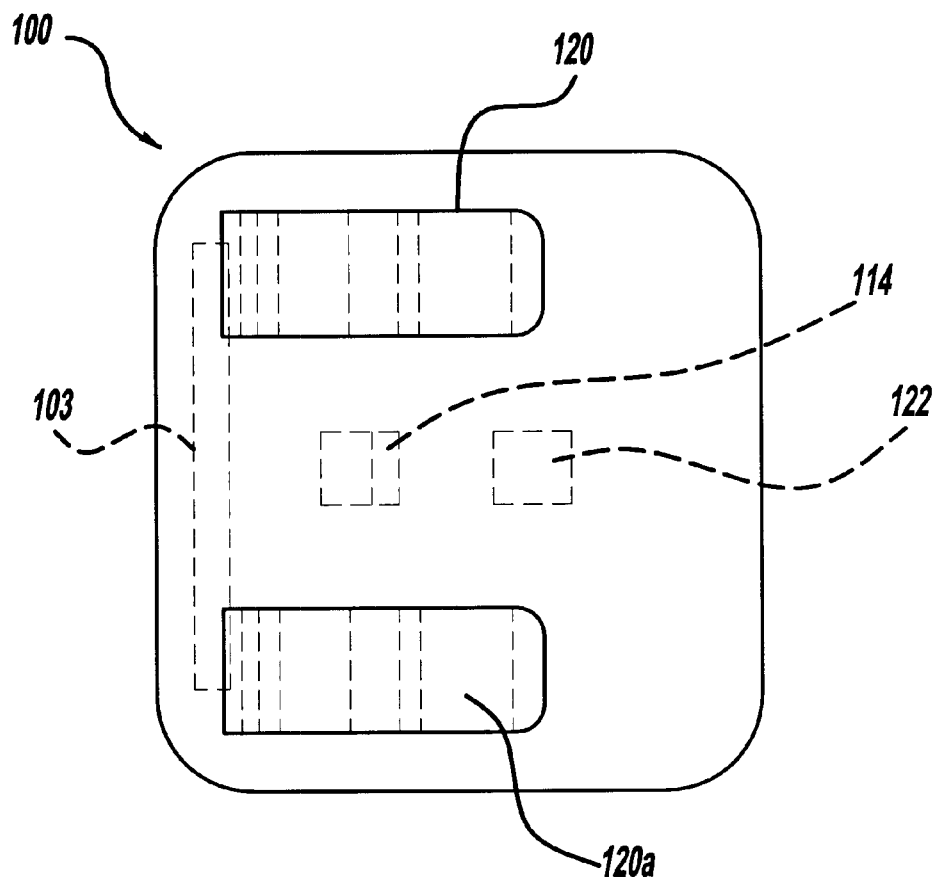
FIG. 8 is a bottom view of the clip of FIG. 3.

Referring now to FIG. 3, a similar protrusion 114 of valve plate 112 stops the clip on the valve plate from traveling too far into the slot portion 116 of the shaft 118. In this embodiment, a resilient clip portion 120 is included for engaging the outer surface of the shaft. Tabs 122 prevent the clip from being withdrawn from the slot by engaging shelf 124 in the wide area of the slot.

In a preferred embodiment, a pair of resilient clip portions 120 and 120a are provided for stabilizing the valve plate 112 on the shaft 118. The clip portion 120 includes a resilient base portion 126, a shaft engagement portion 128 and a ramp portion 130. As shown in FIG. 3, the ramp portion 130 deflects arms 120 and 120a over the shaft 118 until engagement portion 128 engages the shaft against abutment 114. This secures the plate 112 to the shaft 118 and the position is locked in place via the deflectable tab 122.

The clips of the present invention may be readily constructed of a suitable plastic or polymer material, such as a 25% to 40% carbon fiber loaded PPA (polythalamide) or a Nylon 66™ polyamide material, and are lightweight and easy to install in the shafts. Preferably, the valve plate is injection molded in a single piece. These plates are also self-centering in the short runner valve orifice.

Figure 9:
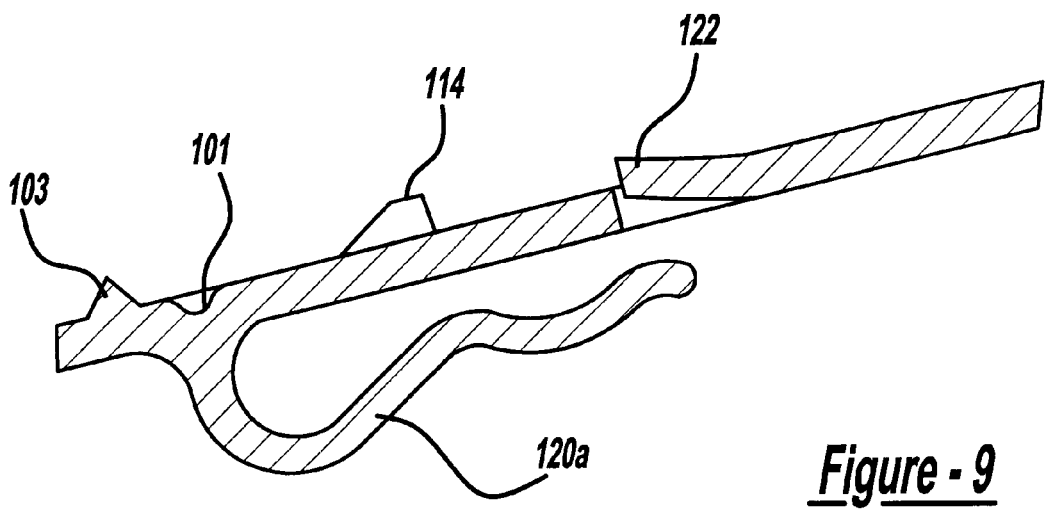
FIG. 9 is a further sectional view of the valve plate of FIG. 3.

Referring now to FIG. 9, a sectional of the valve plate 112 is shown. The difference being that a pre-designed indentation 101 is provided. This indentation reduces the amount of plastic where the clip 102a joins the body of the valve plate 100. This allows and compensates for curing characteristics of the injection mold plastic. This indentation 101 provides for a more constant thickness part which is less susceptible to warpage during cure. The rib 103 is configured to be an injection gate during manufacturing of the part.

Figure 10:
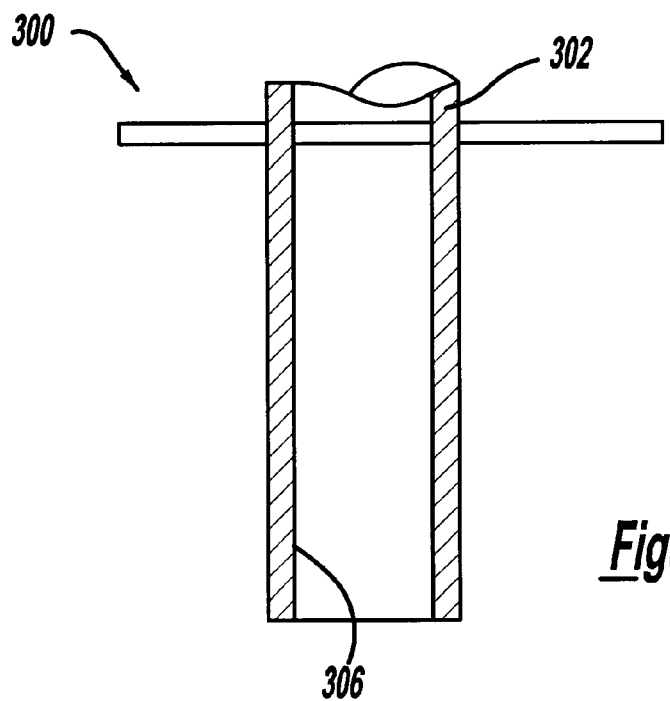
FIG. 10 shows a sectional view of a lubrication applicator for the anti-chatter or shaft biasing of the short runner valve shaft.
Figure 11:
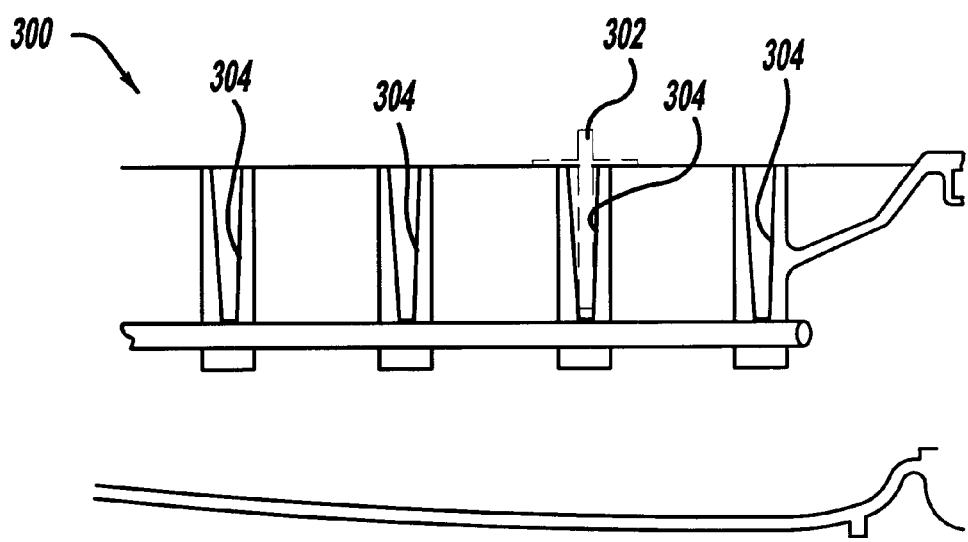
FIG. 11 is a sectional view of a short runner shaft assembly showing the applicator of FIG. 10 lubricating the shaft at the anti-chatter or shaft biasing locations.

Referring now to FIGS. 10 and 11, a method and apparatus for lubricating a short runner valve shaft at the anti-chatter or shaft biasing locations is shown generally at 300. An applicator 302 is provided which is insertable into shaft biasing device cavity or orifice 304 (such as shown in U.S. Pat. No. 5,992,370). The applicator 302 is inserted into the cavity 304 and a lubricant is injected through hollow opening 306 in the applicator 302. Therefore, the anti-chatter device is secured in the cavity or orifice 304. A suitable lubricant such as grease or the like may be utilized.

Thus, the subject lubrication apparatus and method enhances the runner valve biasing or anti-chatter system by adding lubrication. This results in improved performance of the short runner valve system. The lubrication reduces the friction associated with the biasing load or anti-chatter device. This provides for improved system performance, including faster response times, increased durability and reduced actuator torque requirements.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A valve plate for securement to a shaft of an intake member of an engine comprising:
   a polymer body adapted for insertion into a slot in said shaft;
   said polymer body including a plurality of deflectable locking tabs which are deflectable into a planar surface of said molded plastic body, said tabs being insertable through said slot in a first direction;
   said polymer body including a stopping tab for interfering with travel through said slot, wherein said first tab resists withdrawal from said slot in a second direction, thereby securing said body in said slot between said first tab and said tab stop.

2. The valve plate of claim 1 wherein at least one said plurality of tabs extends from a top surface and at least one of said plurality of tabs extends from a bottom surface of said plate.

3. The valve plate of claim 1 further comprising a spring arm extending from said valve plate for engaging said shaft upon insertion of said valve plate into said slot.

4. The valve plate of claim 3 wherein said spring arms are injection molded as a single piece unit with said valve plate.

5. The valve plate of claim 1 further comprising a pair of spring arms.

6. The valve plate of claim 1 wherein said valve plate is a one-piece injection molded member.

7. The valve plate of claim 6 wherein a carbon fiber loaded polythalamide or polyamide material is used for injection molding of said valve plate member.

8. The valve plate of claim 7 wherein the polythalamide or polyamide is 25% to 40% carbon fiber loaded.

9. A one piece short runner valve plate for securement to a short runner shaft, said short runner shaft including a slot therein having a narrow section and a widened section for forming a shelf therein, said valve plate comprising:
   a molded polymer body adapted for insertion through the slot in said shaft;
   at least one deflectable locking tab for deflecting during insertion of said valve plate into said slot and expanding upon reaching the widened section of said slot and abutting said shelf for preventing removal of said valve plate;
   a stopping tab for engaging said shaft and stopping movement of said plate in the direction of insertion of said valve plate; and
   a spring arm including a resilient arm, a shaft engagement portion and a ramp portion wherein as said valve plate is inserted into said slot, said ramp portion deflects the arm around an outside portion of said shaft, and said shaft engaging portion engaging an outside portion of the shaft upon full insertion into said slot.

10. A valve plate for securement to a shaft of an intake member of an engine comprising:
    a polymer body adapted for insertion into a slot in said shaft;
    said polymer body including at least one locking first tab which is insertable through said slot in a first direction;
    said polymer body including a stopping tab for interfering with travel through said slot, wherein said first tab resists withdrawal from said slot in a second direction, thereby securing said body in said slot between said first tab and said tab stop;
    said polymer body being a one-piece injection molded member.

11. The short runner valve plate of claim 10 wherein said first tab is a deflectable tab member deflectable into a planar surface of said molded plastic body.

12. The valve plate of claim 11 further comprising a plurality of deflectable locking tabs.

13. The valve plate of claim 12 wherein at least one said plurality of tabs extends from a top surface and at least one of said plurality of tabs extends from a bottom surface of said plate.

14. The valve plate of claim 10 further comprising a spring arm extending from said valve plate for engaging said shaft upon insertion of said valve plate into said slot.

15. The valve plate of claim 14 wherein said spring arms are injection molded as a single piece unit with said valve plate.

16. The valve plate of claim 10 further comprising a pair of spring arms.

17. The valve plate of claim 10 wherein a carbon fiber loaded polythalamide or polyamide material is used for injection molding of said valve plate member.

18. The valve plate of claim 17 wherein the polythalamide or polyamide is 25% to 40% carbon fiber loaded.

19. A valve plate for securement to a shaft of an intake member of an engine comprising:
    a polymer body adapted for insertion into a slot in said shaft;
    said polymer body including at least one locking first tab which is insertable through said slot in a first direction;
    said polymer body including a stopping tab for interfering with travel through said slot, wherein said first tab resists withdrawal from said slot in a second direction, thereby securing said body in said slot between said first tab and said tab stop;
    a spring arm extending from said valve plate for engaging said shaft upon insertion of said valve plate into said slot.

20. The short runner valve plate of claim 19 wherein said first tab is a deflectable tab member deflectable into a planar surface of said molded plastic body.

21. The valve plate of claim 20 further comprising a plurality of deflectable locking tabs.

22. The valve plate of claim 21 wherein at least one said plurality of tabs extends from a top surface and at least one of said plurality of tabs extends from a bottom surface of said plate.

23. The valve plate of claim 19 further comprising a pair of spring arms.

24. The valve plate of claim 19 wherein said spring arms are injection molded as a single piece unit with said valve plate.

25. The valve plate of claim 19 wherein said valve plate is a one-piece injection molded member.

26. The valve plate of claim 25 wherein a carbon fiber loaded polythalamide or polyamide material is used for injection molding of said valve plate member.

27. The valve plate of claim 26 wherein the polythalamide or polyamide is 25% to 40% carbon fiber loaded.

* * * * *

UNITED STATES PATENT AND TRADEMARK OFFICE
CERTIFICATE OF CORRECTION

PATENT NO. : 6,543,413 B2
DATED : April 8, 2003
INVENTOR(S) : Mark F. Lozen et al.

It is certified that error appears in the above-identified patent and that said Letters Patent is hereby corrected as shown below:

Title page,
Item [75], Inventors, delete "Kevin C. Goldstein, Eastpointe, MI (US)".

Signed and Sealed this

Twenty-third Day of May, 2006

JON W. DUDAS
*Director of the United States Patent and Trademark Office*